United States Patent [19]

Weible

[11] 4,408,244

[45] Oct. 4, 1983

[54] CIRCUIT SAFE AGAINST OVERLOAD FOR VARYING THE AMOUNT OF POWER TO AN ELECTRIC BLOWER MOTOR

[75] Inventor: Reinhold Weible, Stuttgart, Fed. Rep. of Germany

[73] Assignee: Süddeutsche Kühlerfabrik Julius Fr. Behr GmbH & Co. KG, Stuttgart, Fed. Rep. of Germany

[21] Appl. No.: 149,832

[22] Filed: May 14, 1980

Related U.S. Application Data

[63] Continuation of Ser. No. 913,687, Jun. 8, 1978, abandoned.

[51] Int. Cl.³ .......................................... H02H 7/085
[52] U.S. Cl. ...................................... 361/24; 361/27; 361/31; 361/58; 361/106; 318/349; 318/514; 318/785; 318/788; 318/783; 318/784; 318/473; 318/471; 338/220; 310/68 C
[58] Field of Search ...................... 361/24, 25, 26, 27, 361/31, 32, 23, 58, 103, 106, 400, 402; 338/220, 22 R, 22 SD, 23, 24; 310/68 C; 318/348, 349, 785, 788, 783, 784, 358, 359, 434, 514–516, 334, 366, 367, 471, 473, 472

[56] References Cited

U.S. PATENT DOCUMENTS

| 3,418,531 | 12/1968 | Strachan | 361/106 |
| 3,697,863 | 10/1972 | Kilner | 361/106 |

FOREIGN PATENT DOCUMENTS

| 2331708 | 1/1975 | Fed. Rep. of Germany | 361/106 |
| 1149104 | 4/1969 | United Kingdom . | |
| 1316177 | 5/1973 | United Kingdom | 361/106 |

OTHER PUBLICATIONS

"Electronic Digest", 1963, vol. 63, pp. 132–138, German Literature Ref. by Andrich.

*Primary Examiner*—Patrick R. Salce
*Attorney, Agent, or Firm*—Browdy and Neimark

[57] ABSTRACT

A circuit, safe against an overload, for incrementally varying the power to an electric blower motor used for heating, ventilating and conditioning vehicles, having a PTC resistor in series with other series resistors in the circuit.

10 Claims, 9 Drawing Figures

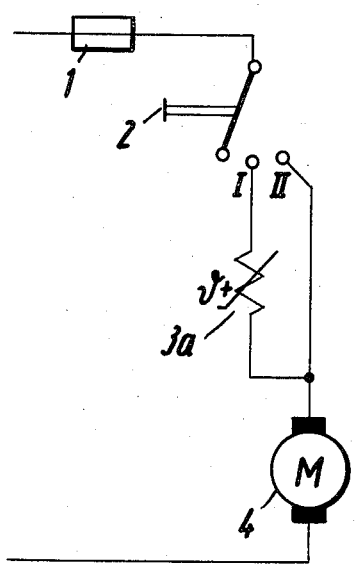
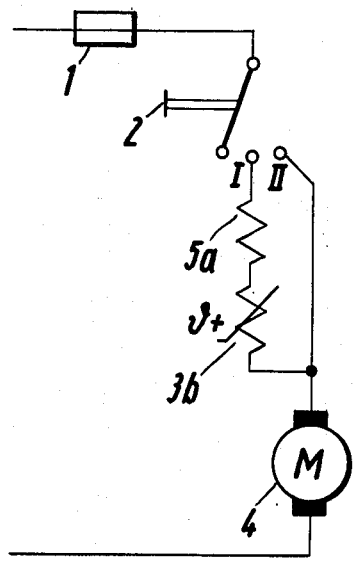
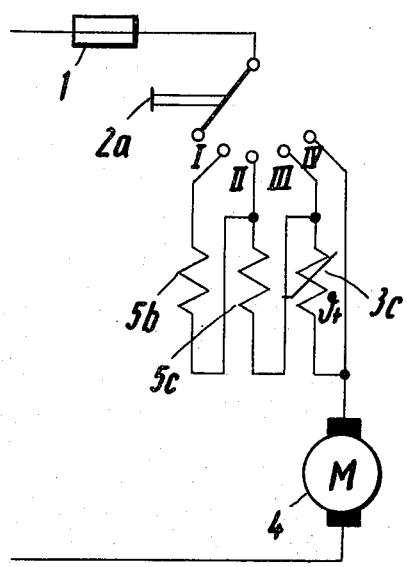
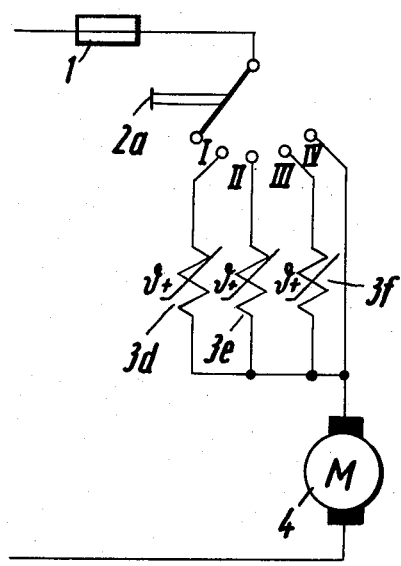

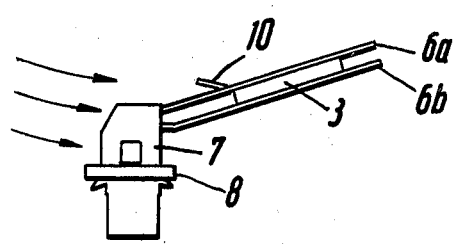
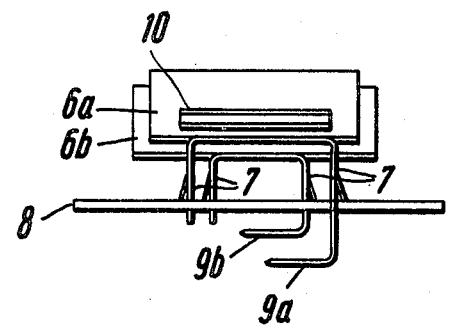
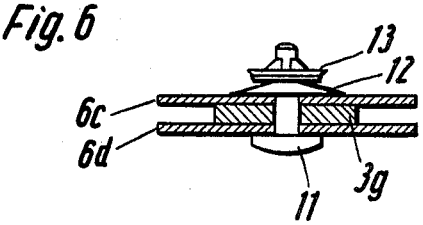
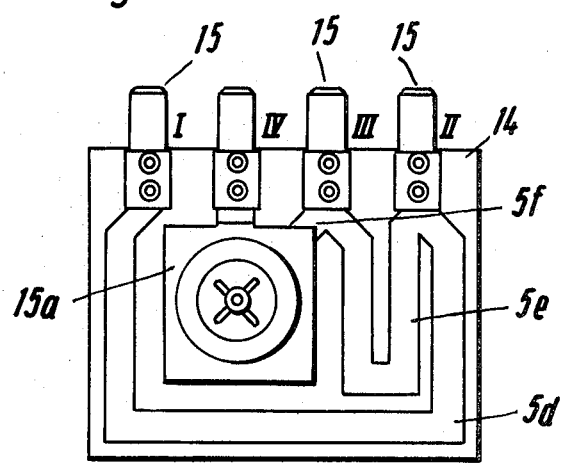
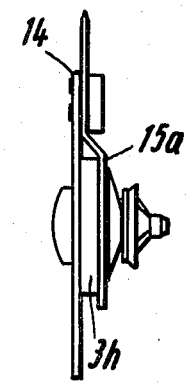

CIRCUIT SAFE AGAINST OVERLOAD FOR VARYING THE AMOUNT OF POWER TO AN ELECTRIC BLOWER MOTOR

This is a continuation of application Ser. No. 913,687, filed June 8, 1978, now abandoned.

FIELD OF THE INVENTION

The invention relates to a circuit, safe against an overload, for varying the amount of power in increments to an electric blower motor, used for heating, ventilation and air conditioning vehicles.

BACKGROUND OF THE INVENTION

In vehicles, predominantly permanently energized, d.c. current motors are used for the powering of heating, ventilation and air conditioning blowers. To achieve the necessary variation in the output of the blower motor wire-wound or printed series power resistors are used.

The power dissipated by the series resistors amounts to, depending on the characteristics of the blower, up to 25% of the electric power input into the blower motor, when the motor is run at its maximum output. The series resistors are disposed, preferably, in the path of the air current of the blower, to dissipate the heat generated by the series resistors.

In case of heavy, blocked or short circuited blower motors, the power dissipation of the series connected resistors increases greatly, while the ability of the system to cool the resistors decreases at the same time. The short circuit current limited by the series resistor, however, is generally not sufficient to trigger the fuse of the blower circuit.

It is known in the art to protect series resistors from damage, destruction or fire, by using high temperature resistant materials from which to make the series resistor and from which to make the materials surrounding the series resistor in the circuit, as well as to protect the place in the circuit surrounding the resistors against penetration by and deposit of combustible foreign bodies. Furthermore, greatly enlarged series resistors are used, which are designed for their ability to cope with short circuits, in case no air current is present to cool the resistors. In these circumstances, however, the series resistors cannot be housed, in most cases, in compactly built heating and blower housings made of thermoplastic plastics. Beside the additional construction space, additional masking and cabling will be necessary.

It is also known to equip series resistors with an excess-temperature switch, which switches the voltage supply directly to the load, thus causing the safety fuse of the blower circuit to respond.

Furthermore, guard switches with reconnecting locks are known, which interrupt the circuit at the series resistor because of excess current and/or excess temperature. These measures require a considerable expenditure of time for the adjusting and checking of the temperature and/or current-dependent switching function. Because of the possibility of the contacts becoming contaminated or coming loose over many years of inoperation, these extra switches may not provide a reliable safety mechanism, or with regard to contact welding.

In case of other known circuits, additional melting or soldering safety devices to protect the resistor circuit have been provided. They are also partly integrated directly into the series resistor. When activated, these safety devices are irreversibly altered; thus their safety function cannot be checked.

In case of expensive, electronic protective circuits, relays or power semiconductors are provided which interrupt the circuit. The turnoff signal results from a temperature, current, voltage or resistance measurement or from a combination of these values. Such protective circuits require sensors which sense the indicated values of a particular variable to be measured, electronic utilization of the indicated value, and a switching member; such protective circuits are expensive and require additional construction space and additional cablings.

SUMMARY OF THE INVENTION

It is an object of the present invention to provide a circuit, safe against an overload, for the varying of power to drive electric blower motors, which prevents damage, destruction and combustion at the place the circuit is located and of the connected switching elements, and which may be arranged spatially together with the blower motor, and requires small expenditure, for assembly and upkeep.

The device which achieves these objectives is made by inserting a PTC (positive temperature coefficient) resistor as a series resistor into the circuit of the elctric blower motor.

Such a resistor with the resistor-temperature characteristic of a PTC resistor, because of its physical properties makes further protective measures despensable. In case of a breakdown, and as a result of the increasing power dissipation and/or failure of the cooling, the temperature of the series resistor increases until the typical reference temperature of the PTC resistor is reached. At this temperature the resistance of the PTC resistor increases suddenly. The power dissipation is recontrolled to the point that the reference temperature is not exceeded. In this way the PTC resistor-series resistance will protect itself and the place in the circuit where it is inserted, against thermal overload damage and combustion. Moreover, the winding of the blower motor is protected against an overload.

For the varying of the power in increments it will be advantageous, if after a further development of the invention, for the PTC resistor to be put in series with one or more fixed series resistors.

According to a preferred embodiment of the invention the PTC resistor is disposed between two metallic electric contact plates.

According to an additional embodiment of the invention the plates may be provided with ribs to cause turbulence in an air stream.

The PTC resistor may be soldered or glued together with the contact or cooling plate, according to the invention.

According to another embodiment of the invention the PTC resistor is clamped resiliently by means of a spring element and a clamping element, between the plates.

Advantageously the series resistors are disposed in the air current of the blower.

According to a still other embodiment of the invention the cooling and contact plates are made of one piece with a contact plug.

Further advantages and characteristics of the invention will be explained in more detail on the basis of the drawings.

BRIEF DESCRIPTION OF THE DRAWINGS

FIG. 1 is a schematic two-step blower control with a blower switch.

FIG. 2 is a schematic two-step blower control showing the series resistor split into a fixed resistor and a PTC resistor.

FIG. 3 shows a schematic four step blower control circuit.

FIG. 4 shows a modification of the schematic circuit in FIG. 3.

FIG. 5 shows a front elevation of the mechanical construction of part of the circuit of FIG. 1.

FIG. 5a shows a side elevation of the mechanical construction of part of the circuit depicted in FIG. 5.

FIG. 6 shows a side elevational view cross sectional of a clamping connection between a PTC resistor and cooling and contact surfaces, and FIG. 7a shows a side elevation of a part of a modification of a mechanical construction of the circuit shown in FIG. 3.

FIG. 7b shows a front elevation of a part of a modification of a mechanical construction of the circuit shown in FIG. 3.

DESCRIPTION OF THE PREFERRED EMBODIMENT

In case of the embodiment shown in FIG. 1, a blower stepping switch 2 is arranged in the circuit of a blower motor 4, which is fused by a vehicle fuse 1, as well as a PTC resistor 3a as a self-fusing series resistor for the first blower step. In the second blower step, the motor 4 is protected by the vehicle fuse 1.

In case of the embodiment shown in FIG. 2, the series resistor 3a is split up into a fixed resistor 5a and a PTC resistor 3b. In this circuit, the operational power dissipation for the PTC resistor 3 is reduced as compared to FIG. 1. The PTC resistor 3 is advantageously combined spatially with the fixed resistor 5a, and acts above all as a temperature and current limiting safety element.

In case of the embodiment shown in FIG. 3, a four step blower control switch is shown, where the PTC resistor 3c advantageously is combined spatially with the fixed resistors 5b and 5c and, in the blower steps I, II, III acts both as a series resistor as well as a temperature and current limiting safety element. The PTC resistor may also be split up as shown in embodiment 2.

In case of the circuit shown in FIG. 4, a four step blower control switch, is shown, wherein PTC resistors 3d, 3e, and 3f are always used as self-fusing series resistors of a blower step. Here too, the individual PTC resistors 3 may be split up as in the embodiment of FIG. 2.

The PTC series resistor 3 needs to be of such size so as to function only for the operational power dissipation. No additional parts are required to guard against cases of interference. The PTC-series resistor may thus be built compactly and may be inserted directly into the thermoplastic heating and blower housings. The PTC-series resistor has no movable parts whatever, and therefore is not subject to any wear which could limit its functioning as a safety device in long-term operations. Furthermore, the PTC resistor retains its original temperature dependance after repeated heating above its reference temperature and may thus be checked at any time. After the safety function of the PTC-series resistor 3 has been activated, a little cooling will suffice, for example, by a short turning off of the operational voltage, to put the PTC resistor again into its original state. Furthermore, it is advantageous that the PTC-series resistors require no additional expenditure for cabling.

Particularly favorable embodiments of the mechanical structure of series resistors which are safe against an overload, are shown in FIGS. 5 to 7. FIG. 5 shows a mechanical PTC-series resistor 3 as in FIG. 1. The PTC resistor 3 has been connected by soft soldering, electrically, thermally and mechanically to two metallic closing and cooling plates 6a and 6b.

Angular legs 7 of the connecting plates 6a and 6b are riveted or wedged or poured onto an electrically isolated base plate 8. The legs 7, at the same time, serve as electric plug contacts 9a and 9b. The cooling plates 6a and 6b are preferably disposed in the air stream of the blower and, for improving the cooling effect, they may be provided with additional ribs or stampings 10 for causing turbulence in an air stream.

In the embodiment shown in FIG. 6, the PTC resistor 3g is again jammed between the cooling and contact surfaces 6c and 6d. The disc-shaped PTC resistor 3g has a central hole. An insulating peg 11, together with a spring element 12, for example a spring plate or plate spring, and a clamping element 13, for example a safety disc (washer) or a nut, holds the the contact surface 6c and 6d and the PTC resistor 3g together resiliently. For a better electric or thermal contact, a corresponding conductive paste may be applied between the PTC resistor 3g and the contact surfaces 6c and 6d.

The embodiment shown in FIGS. 7 and 7a comprises a mechanical construction of a circuit arrangement as in FIG. 3. Printed resistors 5d and 5e are disposed on a base plate 14, and are connected with a contact or connecting plug 15. The path of the resistors 5f serves as a contact surface for the PTC resistor 3h. The PTC resistor 3h is connected by a clamping connection, according to FIG. 6, with the contact surface 5f and the plug 15a, expanding from one piece into the cooling and connecting plate.

It will be obvious to those skilled in the art, that various changes may be made without departing from the scope of the invention, and the invention is not to be considered limited to what is shown in the drawings and described in the specification.

What is claimed is:

1. In a vehicle having a direct current blower motor used for heating, ventilating or air conditioning, a circuit for controlling said motor to cause the motor to operate at one of at least two incremental speeds, a direct current power source, a main power line extending from said power source to a selector switch, a main system fuse in said power line between said source and said selector switch, at least two branch circuits corresponding in number to said at least two speeds at which said motor is to be operated, a first of said two branch circuits interconnecting said motor to said selector switch, said selector switch selecting one only of said branch circuits at a time to interconnect said motor and said power source, said fuse being operative to protect a first one of said branch circuits, and at least one PTC resistor in at least a second one of said branch circuits; whereby said PTC resistor in said at least second one of said branch circuits protects said motor when said selector switch connects said at least one PTC resistor to said motor by limiting the current to said motor, thereby automatically reducing the speed of said motor when the predetermined temperature of said PTC resistor is exceeded, and whereby said at least one PTC-resistor protects itself against thermal overload and the blower motor and the circuit for supplying variable power are also protected from thermal overload; and whereby said main system fuse protects said motor when a branch circuit not containing a PTC resistor is connected by said selector switch to said motor.

2. A circuit according to claim 1, further including at least one series resistor disposed in said branch circuit so as to be in series with said at least one PTC resistor.

3. A circuit according to claim 1, further including two metallic plates between which said at least one PTC resistor is held, and said metallic plates connecting said at least one PTC resistor into said branch circuit.

4. A circuit according to claim 3, wherein said metallic plates are provided with ribs to cause turbulence when an air stream passes thereover.

5. A circuit according to claim 3, wherein said at least one PTC resistor is soldered to said two metallic plates.

6. A circuit according to claim 3, wherein said at least one PTC resistor is glued to said two metallic plates.

7. A circuit according to claim 3, further including a clamping means connected to said two metallic plates for clamping said plates together, and spring means connected between said clamping means and one of said metallic plates for causing said clamping means to resiliently hold said two metallic plates together.

8. A circuit according to claim 3, wherein one of said metallic plates acts as a base plate on which said at least one PTC resistor is held and the other of said metallic plates is a connecting plug which acts as a base plate.

9. A circuit according to claim 1, wherein said motor is a direct current blower motor used to produce an air stream for temperature control of said vehicle interior, said at least one PTC resistor being operative to vary the current supplied to said blower motor as a function of the temperature of said at least one PTC resistor so as not to exceed critical heating thereof, and said at least one PTC resistor being disposed in said air stream of said blower motor to subject said at least one PTC resistor to a cooling effect thereof.

10. A circuit according to claim 1, further including at least one series resistor disposed in said branch circuit in series with said at least one PTC resistor and wherein said at least one PTC resistor and said at least one series resistor are both disposed in the air stream caused by said blower motor.

* * * * *